United States Patent
Kovach et al.

(10) Patent No.: US 9,661,797 B2
(45) Date of Patent: May 30, 2017

(54) SHEARABLE LINK FOR DISK BLADE PROTECTION

(71) Applicant: CNH Industrial America LLC, New Holland, PA (US)

(72) Inventors: Michael G. Kovach, Morton, IL (US); Eric J. Anderson, Metamora, IL (US)

(73) Assignee: CNH Industrial America LLC, New Holland, PA (US)

( * ) Notice: Subject to any disclaimer, the term of this patent is extended or adjusted under 35 U.S.C. 154(b) by 340 days.

(21) Appl. No.: 14/523,237

(22) Filed: Oct. 24, 2014

(65) Prior Publication Data

US 2015/0129257 A1    May 14, 2015

Related U.S. Application Data

(60) Provisional application No. 61/903,451, filed on Nov. 13, 2013.

(51) Int. Cl.
*A01B 61/04* (2006.01)
*A01B 23/04* (2006.01)

(52) U.S. Cl.
CPC .......... *A01B 61/042* (2013.01); *A01B 23/046* (2013.01); *A01B 61/046* (2013.01)

(58) Field of Classification Search
CPC ..... A01B 61/042; A01B 61/04; A01B 61/044; A01B 61/046; A01B 23/046; A01B 21/083
USPC ................ 172/261, 264, 271, 266, 482, 564
See application file for complete search history.

(56) References Cited

U.S. PATENT DOCUMENTS

| | | | |
|---|---|---|---|
| 4,057,112 A | 11/1977 | Taylor | |
| 4,068,723 A | 1/1978 | Quanbeck | |
| 4,210,209 A | 7/1980 | van der Lely | |
| 4,236,583 A * | 12/1980 | Geurts | A01B 61/046 172/266 |
| 4,387,910 A | 6/1983 | van der Lely | |
| 4,546,832 A * | 10/1985 | Dietrich, Sr. | A01B 61/046 172/260.5 |
| 4,724,910 A * | 2/1988 | Wheeler | A01B 61/046 172/178 |
| 4,834,189 A | 5/1989 | Peterson et al. | |
| 5,040,616 A | 8/1991 | Hake | |
| 5,486,668 A | 1/1996 | Erickson | |
| 5,785,128 A | 7/1998 | Redekop | |

(Continued)

FOREIGN PATENT DOCUMENTS

GB    2 125 663 A    3/1984

*Primary Examiner* — Matthew D Troutman
(74) *Attorney, Agent, or Firm* — Rebecca L. Henkel; Rickard K. DeMille

(57) ABSTRACT

A mechanical coupling arrangement for interconnecting a compression spring assembly and certain working tools such as the disks of an agricultural tillage implement includes a hinge having a pivot axis and first and second arms extending from the pivot axis. Linkage arrangements couple the first hinge arm to the spring assembly and the second hinge arm to the working tools. A shear pin extends between the hinge arms remote from the pivot axis for fixing the angular relationship between the arms so long as the spring compression remains less than a predetermined maximum. Shear pin failure allows one hinge arm to pivot relative to the other when the predetermined maximum tension is exceeded uncoupling the spring assembly from the tools.

11 Claims, 4 Drawing Sheets

(56) References Cited

U.S. PATENT DOCUMENTS

| | | | |
|---|---|---|---|
| 6,276,462 B1 * | 8/2001 | Dietrich, Sr. | A01B 49/02 172/138 |
| 6,431,287 B1 | 8/2002 | Ramp | |
| 6,557,646 B1 | 5/2003 | Hurtis et al. | |
| 7,578,356 B2 * | 8/2009 | Newman | A01B 61/04 172/264 |
| 7,743,844 B2 * | 6/2010 | Kovach | A01B 23/046 172/261 |
| 2009/0166048 A1 | 7/2009 | Wiedenmann | |
| 2014/0116736 A1 * | 5/2014 | Dietrich, Sr. | A01B 61/044 172/664 |

* cited by examiner

SHEARABLE LINK FOR DISK BLADE PROTECTION

CROSS REFERENCE TO RELATED APPLICATIONS

This is a non-provisional application based upon U.S. provisional patent application Ser. No. 61/903,451 entitled "SHEARABLE LINK FOR DISK BLADE PROTECTION", filed Nov. 13, 2013, which is incorporated herein by reference.

BACKGROUND OF THE INVENTION

1. Field of the Invention

The present invention relates to agricultural implements, and, more particularly, to agricultural field tillage implements.

2. Description of the Related Art

Field tillage is an important initial aspect of agricultural crop planting and harvesting. In the spring when good weather prevails, it is desirable to accomplish tilling of fields in a fairly short time with a minimum of interruption. Occasionally, obstacles such as large rocks are encountered which interrupt or interfere with continued tilling. Large rocks or other impediments have the potential to damage the tilling machinery. To avoid or minimize equipment damage, spring biasing of the soil working tools is frequently employed. On some equipment, a set of soil working tools such as disks, are coupled to a spring pack which has one or more coil compression springs coupled to allow limited vertical motion of the disks when one or more of those disks encounters enhanced resistance to the forward motion of the implement. The spring pack is configured as a toggle mechanism which, when potentially damaging resistance is encountered, trips and rotates over center so that the set of disks remains in a fixed position interrupting tilling until the machinery is stopped and the spring pack reset. This resetting is a very time consuming process. Simply blocking the spring pack so that it can not toggle past center solves the problem, but raises the potential of significant damage to the equipment.

SUMMARY OF THE INVENTION

The present invention provides a shearable link in the front rockshaft connection of an agricultural tillage implement which will shear under a predetermined force thereby preventing the spring pack from going over center.

The invention in one form is directed to an agricultural tillage implement which has a main frame section to be coupled to and towed by a traction unit in a generally horizontal forward direction of travel. There are a plurality of generally downwardly depending soil working tools suspended from the main frame section for limited generally vertical movement. A compression spring assembly biases certain ones of the working tools generally vertically downwardly. A mechanical coupling between the compression spring assembly and working tools compresses the spring assembly and allows limited generally vertical working tool displacement when the working tools encounter enhanced resistance to implement motion. There is a tool frame common to the working tools and an axially rotatable shaft extends generally transversely along the tool frame. An eccentric coupling between the tool frame and shaft induces shaft rotation in response to generally vertical working tool displacement. An eccentric arm extends from the shaft at a location axially remote from the eccentric coupling with a linkage extending from the eccentric arm to the spring assembly for compressing the spring assembly in response to shaft rotation. A yieldable link connects the linkage and eccentric arm and fails thereby disconnecting the linkage from the eccentric arm when the compression force on the spring assembly reaches a predetermined maximum.

The invention in another form is directed to a mechanical coupling arrangement for interconnecting a compression spring assembly and working tools of an agricultural tillage implement which functions to compress the spring assembly allowing limited generally vertical working tool displacement relative to the frame of the agricultural tillage implement when the working tools encounter enhanced resistance to implement motion. There is a tool frame common to the working tools and an axially rotatable shaft extends generally transversely along the tool frame. An eccentric coupling between the tool frame and shaft induces shaft rotation in response to generally vertical working tool displacement. An eccentric arm extends from the shaft at a location axially remote from the eccentric coupling with a linkage extending from the eccentric arm to the spring assembly for compressing the spring assembly in response to shaft rotation. A yieldable link connects the linkage and eccentric arm and fails disconnecting the linkage from the eccentric arm when the compression force on the spring assembly reaches a predetermined maximum.

The invention in a further form provides a mechanical coupling for interconnecting a compression spring assembly and certain working tools of an agricultural implement for compressing the spring assembly and allowing limited generally vertical working tool displacement relative to the frame of the tillage implement when the working tools encounter enhanced resistance to implement motion. The coupling includes a toggle such as a first class lever arm for converting applied tension into spring compression and a linkage portion for converting tool displacement into applied toggle tension. The linkage portion has a shaft with an axis extending transversely of the implement and a first eccentric extending from the shaft. There is a first eccentric follower extending from the first eccentric to the working tools. A hinge has a pivot axis with first and second arms extending therefrom. A link couples the first hinge arm to the toggle. The second hinge arm forming a second eccentric extends from the shaft axially remote from the first eccentric. A shear pin extends between the hinge arms remote from the pivot axis fixing the angular relationship between the arms so long as the applied toggle tension remains less than a predetermined maximum and fails allowing one hinge arm to pivot relative to the other when the predetermined maximum tension is exceeded. Shear pin failure occurs prior to the coil spring axis reaching alignment with the first class lever arm fulcrum.

An advantage of the present invention is that equipment overload or damage by field obstacles is avoided while spring pack over-center toggling is prevented.

Another advantage is less equipment down time during farm field tilling.

Yet another advantage is simple resetting of the overload protection.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
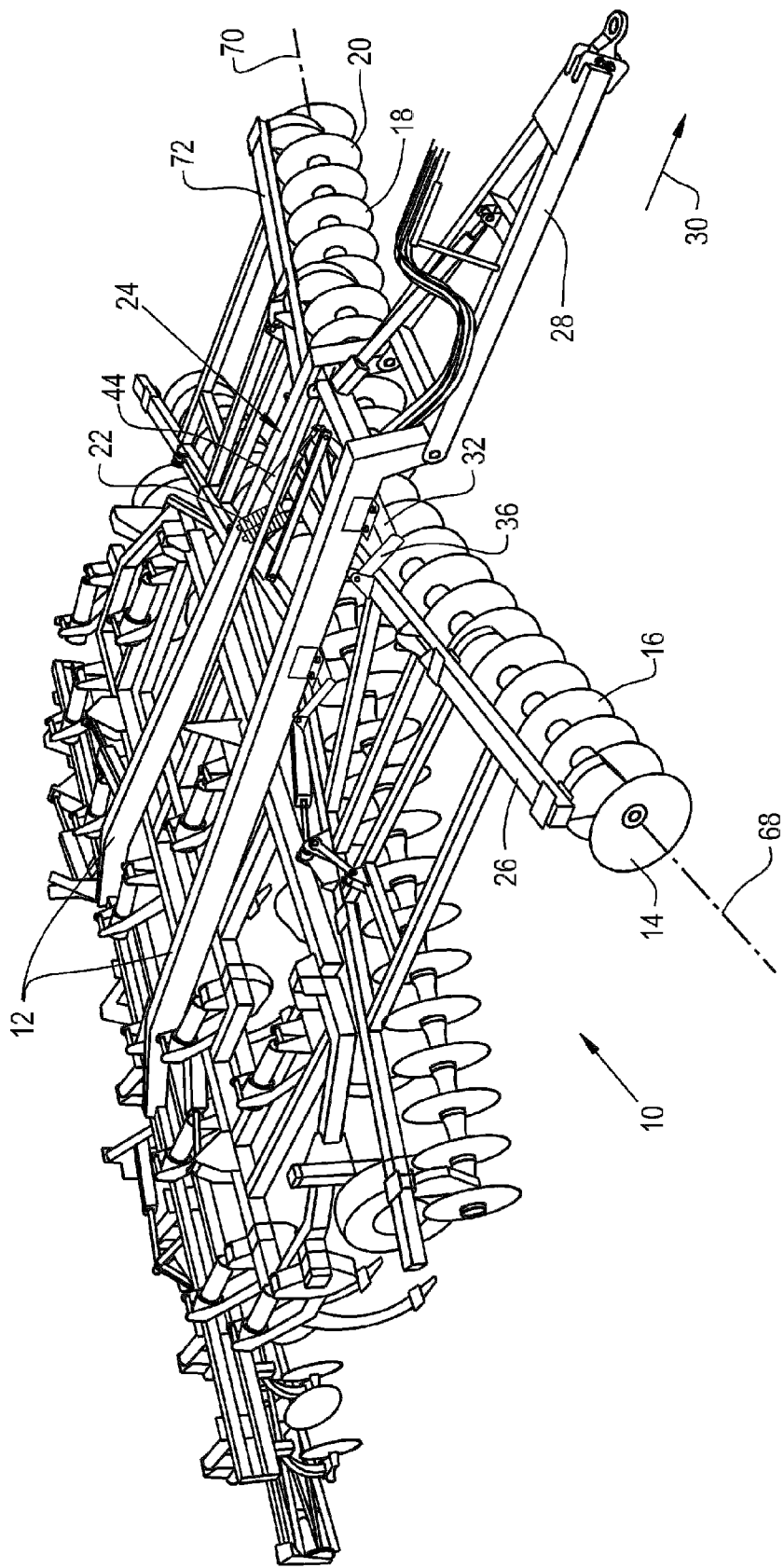
FIG. 1 is a perspective view of an agricultural tillage implement incorporating the invention in one form.

Referring now to the drawings, and more particularly to FIG. 1, there is shown an agricultural tillage implement 10 which generally includes a main frame section 12 and a plurality of soil working tools such as disks 14 and 16 of a first set of disks, and disks 18 and 20 of a second set of disks. A compression spring assembly 22 has a mechanical coupling 24 to a working tool frame 26 which supports certain of the disks for limited vertical movement. The hitch or implement tongue 28 is adapted to connect the implement with a traction unit for motion in the direction of travel 30. The mechanical coupling 24 which is better seen in FIG. 2 generally includes rockshaft 32 having an axis 34 and several eccentrics.

Figure 2:
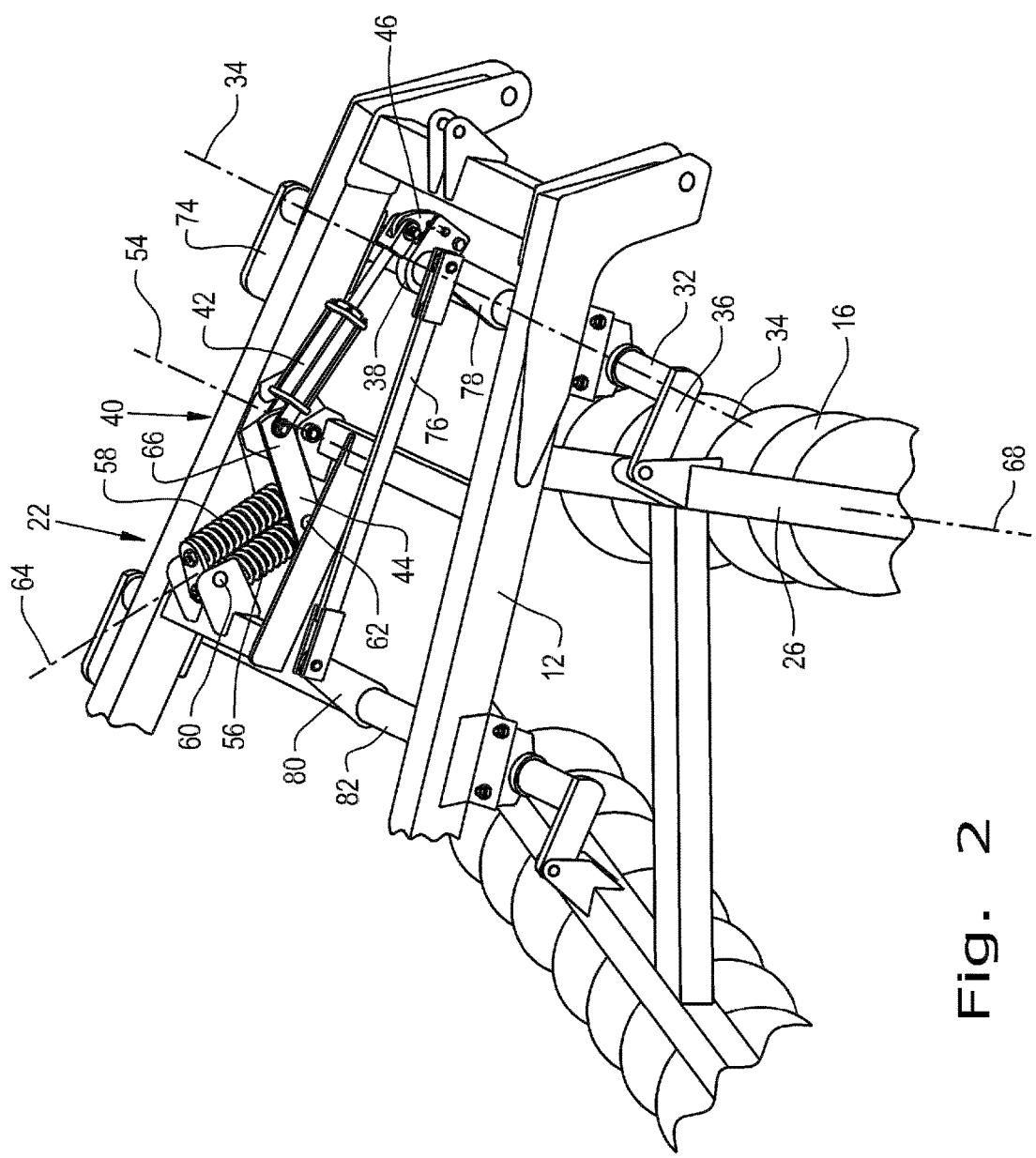
FIG. 2 is an isometric view of a portion of the implement of FIG. 1.
Figure 3A:
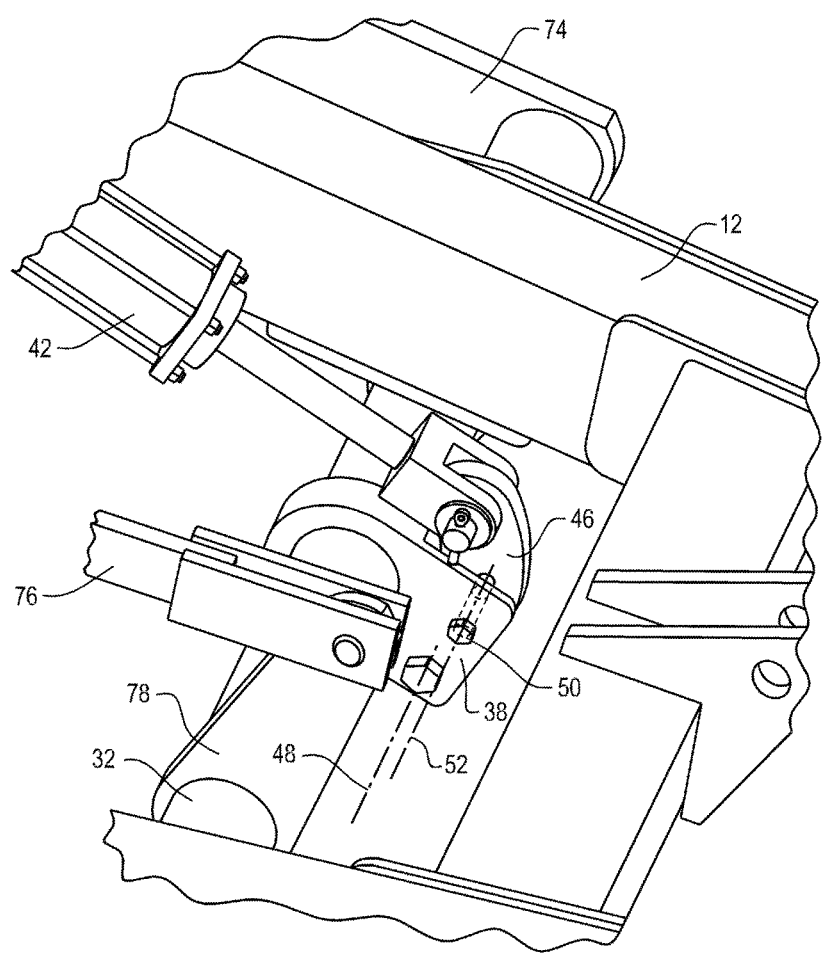
FIG. 3A is an isometric view of a portion of FIG. 2.
Figure 3B:
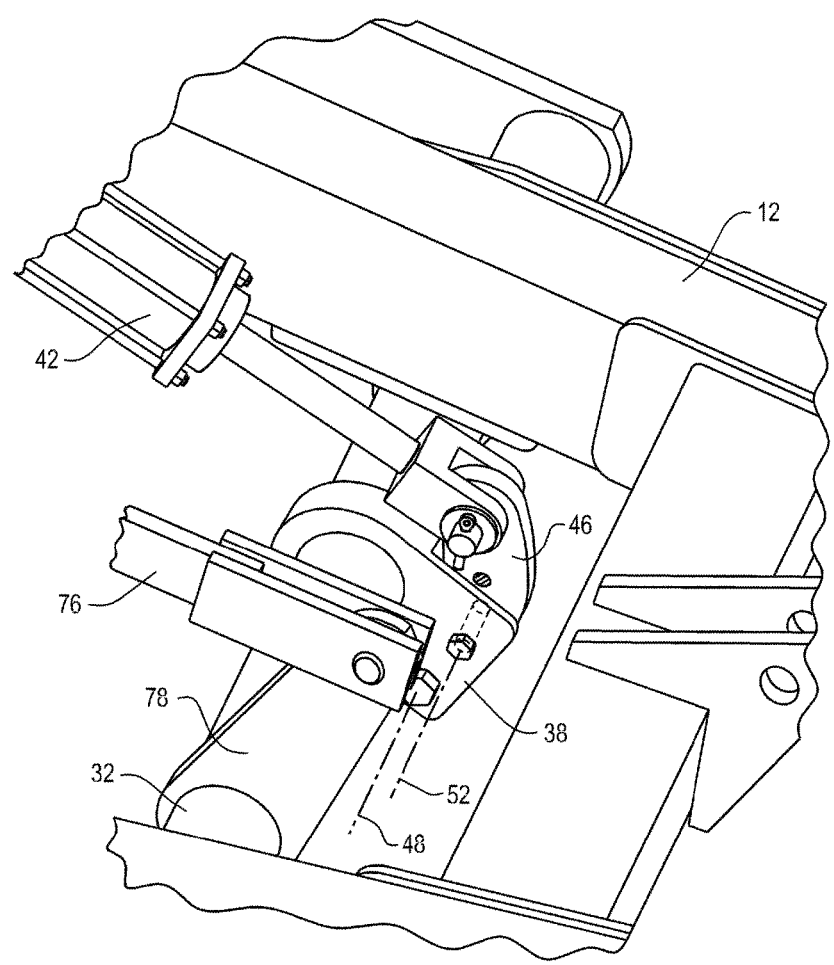
FIG. 3B is an isometric view similar to FIG. 3A, but illustrating the yieldable link mechanism in the failed state.

Now, additionally referring to FIGS. 2, 3A and 3B, the linkage includes the rockshaft or shaft 32 having an axis 34 and an eccentric coupling 36 which extends away from axis 34 to be coupled to the working tools by a cam follower. An eccentric arm 38 is also fixed to and extends away from the shaft 32 at a location axially spaced from the eccentric coupling 36. The linkage 40 which converts tool displacement into tension and resulting spring compression further includes tension transmitting hydraulic cylinder 42 and lever or toggle 44. Eccentric arm 38 is one arm of a hinge which is joined to another hinge arm 46 along pivot axis 48. The hinge structure may take the form of a pair of metal plates fixed to and extending from the shaft to form a clevis which receives and is pivotably joined to the other hinge arm by a bolt or pin along axis 48. The two hinge portions have a normally fixed angular relationship due to the presence of a shear pin or yieldable link 50 which passes into each hinge arm portion along an axis 52 spaced from hinge axis 48.

During a normal field tilling operation, the implement is pulled along in the direction of arrow 30 and the disks such as 14 and 16 encounter varying soil conditions. If an unusually rigid area is encountered, the disks are urged upwardly causing eccentric coupling 36 to pivot clockwise as viewed about axis 34. This clockwise rotation is transmitted by shaft 32 to the eccentric hinge arm 38 and hinge arm 46 applying tension through the hydraulic cylinder 42 and inducing clockwise rotation of toggle 44 about its axis 54. Axis 54 acts as a fulcrum for the toggle 44 which behaves as a first class lever compressing the spring assembly. When the resistance to implement motion subsides, the spring assembly expands and shaft 32 and its associated eccentrics rotate counterclockwise lowering the tools.

The spring assembly 22 includes one or more individual coil springs 56 and 58 fixed along a common pivot to the frame at 60 and to another common pivot near the remote end of lever 44 load arm 62. A spring assembly axis 64 extending between these two pivots normally remains beneath the axis 54. Should the axis 64 pass across axis 54, the spring assembly would rotate over center to a tripped condition and thereafter be ineffective to absorb any further tool motion until reset. The shearing of pin 50 prevents over center tripping.

If the enhanced resistance to implement motion becomes excessive and the applied toggle tension on lever arm 66 from hydraulic cylinder 42 reaches a predetermined maximum, the shear pin 50 fails allowing free pivotal motion between the eccentric hinge arm 38 and hinge arm 46. As seen in FIG. 3B, this failure of the shear pin allows the shaft 32 to rotate counterclockwise as viewed and the working tools to return to their lowermost position.

Referring back to FIG. 1, the tillage implement 10 has disks such as 14 and 16 disposed along a common transverse axis 68 while a second set of disks including 18 and 20 are disposed along a different transverse axis 70 which is skewed somewhat relative to axis 68. The second set of disks are suspended from a common tool frame 72 for limited vertical movement. The shaft 32 has a second eccentric coupling 74 with a connection to the tool frame 72 so that upward movement of either set of disks is transmitted to the shaft 32 the rotation of which compresses the spring assembly 22. This sharing of the spring assembly 22 and of the shear pin 50 may be further extended to additional sets of tools by a longitudinal link 76 connecting further eccentric connector arms 78 and 80 of shafts 32 and 82 respectively. With this arrangement, extension or retraction of the hydraulic cylinder 42 effectively changes the length of the linkage between the lever arm 66 and hinge arm 46 to control the lowermost location of multiple sets of soil working disks. Moreover, excess disk upward motion of any one of several disk sets and the resulting excess spring assembly compression is limited by the common shear pin 50.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a main frame section adapted to be coupled to and towed by a traction unit in a horizontal forward direction of travel;
   a plurality of downwardly depending soil working tools suspended from the main frame section for limited vertical movement relative thereto;
   at least one compression spring assembly for biasing certain ones of the working tools vertically downwardly; and
   a mechanical coupling between said compression spring assembly and said certain working tools for compressing said spring assembly and allowing limited vertical working tool displacement when the said certain working tools encounter enhanced resistance to implement motion, said coupling comprising:
      a tool frame common to said certain working tools;
      an axially rotatable shaft extending transversely along the tool frame;

an eccentric coupling between said tool frame and said shaft for inducing shaft rotation in response to vertical working tool displacement;

an eccentric arm extending from said shaft at a location axially remote from said eccentric coupling;

a linkage extending from the eccentric arm to the spring assembly for compressing the spring assembly in response to shaft rotation; and a yieldable link connecting the linkage and eccentric arm, said yieldable link failing and disconnecting the linkage from the eccentric arm when the compression force on the spring assembly reaches a predetermined maximum, wherein the yieldable link comprises a hinge having a pivot axis and two relatively movable legs extending therefrom, one leg comprising said eccentric arm and the other leg pivotably coupled to said linkage, and a shear pin at a location spaced from the pivot axis coupling the hinge legs together to prevent relative movement between the legs so long as the compression force on the spring assembly remains less than the predetermined maximum.

2. The agricultural tillage implement of claim 1, wherein said spring assembly includes at least one coil compression spring pivotably fixed to the main frame at one end, and a first class lever having a fulcrum fixed to the main frame, a load arm pivotably fixed to the compression spring other end and an applied force arm connected to said linkage.

3. The agricultural tillage implement of claim 2, wherein the coil spring has an axis extending between said one end and the load arm pivot, whereby as the compression increases the coil spring axis approaches the fulcrum with link failure occurring prior to the coil spring axis reaching alignment with the fulcrum.

4. The agricultural tillage implement of claim 1, wherein said certain working tools comprise a set of disks coaxially disposed on a transverse common axis.

5. The agricultural tillage implement of claim 4, further comprising at least a second set of disks coaxially disposed on a second transverse common axis skewed relative to said common axis, a second tool frame common to said second set of disks, and a second eccentric coupling between the second tool frame and said axially rotatable shaft remote from both said eccentric coupling and said eccentric arm whereby tool displacement when either set of disks encounters enhanced resistance to implement motion is translated into shaft rotation and spring compression.

6. The agricultural tillage implement of claim 1, further including a hydraulic cylinder disposed within said linkage for controllably varying the linkage length between the compression spring and the eccentric arm thereby determining the lowermost position of said plurality of soil working tools.

7. A mechanical coupling arrangement for interconnecting a compression spring assembly and certain working tools of an agricultural tillage implement for compressing the spring assembly and allowing limited vertical working tool displacement relative to the frame of the agricultural tillage implement when the said certain working tools encounter enhanced resistance to implement motion, said mechanical coupling arrangement comprising:

a tool frame common to said certain working tools;

an axially rotatable shaft extending transversely along the tool frame;

an eccentric coupling between said tool frame and said shaft for inducing shaft rotation in response to vertical working tool displacement;

an eccentric arm extending from said shaft at a location axially remote from said eccentric coupling;

a linkage extending from the eccentric arm to the spring assembly for compressing the spring assembly in response to shaft rotation; and a yieldable link connecting the linkage and eccentric arm, said yieldable link failing and disconnecting the linkage from the eccentric arm when the compression force on the spring assembly reaches a predetermined maximum, wherein the yieldable link comprises a hinge having a pivot axis and two relatively movable legs extending therefrom, one leg comprising said eccentric arm and the other leg pivotably coupled to said linkage, and a shear pin at a location spaced from the pivot axis coupling the legs together to prevent relative movement between the legs so long as the compression force on the spring assembly remains less than the predetermined maximum.

8. The mechanical coupling arrangement of claim 7, wherein said compression spring assembly includes at least one coil compression spring pivotably fixed to the implement frame at one end, and a first class lever having a fulcrum fixed to the implement frame, a load arm pivotably fixed to the compression spring other end and an applied force arm connected to said linkage.

9. The mechanical coupling arrangement of claim 8, wherein the coil spring has an axis extending between said one end and the load arm pivot, whereby as the compression increases the coil spring axis approaches the fulcrum with link failure occurring prior to the coil spring axis reaching alignment with the fulcrum.

10. The mechanical coupling arrangement of claim 7, further including a second tool frame common to a further set of working tools, a second eccentric coupling between the second tool frame and said axially rotatable shaft remote from both said eccentric coupling and said eccentric arm whereby tool displacement when either set of working tools encounter enhanced resistance to implement motion is translated into shaft rotation and spring compression.

11. The mechanical coupling arrangement of claim 7, further including a hydraulic cylinder disposed within said linkage for controllably varying the linkage length between the compression spring and the eccentric arm thereby determining the lowermost position of said certain working tools.

* * * * *